Oct. 30, 1962 R. E. LODERHOSE 3,061,172

PHONOGRAPH JACKET AND METHOD OF MAKING SAME

Original Filed Feb. 29, 1960

INVENTOR.
Richard E. Loderhose

BY Irving Seidman

ATTORNEY

United States Patent Office 3,061,172

Patented Oct. 30, 1962

3,061,172
PHONOGRAPH JACKET AND METHOD OF MAKING SAME

Richard E. Loderhose, 84—25 Radnor Road, Jamaica Estates, N.Y.

Original application Feb. 29, 1960, Ser. No. 11,520, now Patent No. 2,986,325, dated May 30, 1961. Divided and this application Jan. 31, 1961, Ser. No. 86,016
4 Claims. (Cl. 229—68)

This invention relates to phonograph record jackets or envelopes and, more particularly, to novel record jackets or envelopes having on the face thereof an easily detachable picture.

This application is a division of the prior application Serial No. 11,520, filed February 29, 1960, now Patent No. 2,986,325.

This invention also relates to inexpensive rapid methods of manufacturing the aforesaid record jackets.

The jackets or envelopes of many records comprise an essentially square envelope of cardboard or the like covered with one or more layers of paper glued thereto, the outer layer of paper being "slick" paper, i.e. having a glossy finish. This outer layer is imprinted, in black and white or in color, with information including the title or titles of the recordings on the record. Quite frequently, this outer layer is imprinted with the picture of the recording group or the individual artist, and sometimes the artists' picture carries an autograph.

It so happens that fans, particularly in the younger age groups, collect pictures of their favorite recording stars, especially where these pictures carry an autograph of the star. As a result, it is a quite common expedient to cut or otherwise remove such pictures from a record jacket or envelope. As the outer layer of glossy paper imprinted with the picture is firmly adhered to the underlying material of the record jacket, it is difficult to remove the picture intact from the jacket and, when removal of this type is attempted, the picture may be torn or otherwise damaged. Consequently, the more common expedient is to cut the picture carrying section out of the wall of the jacket, thus leaving a relatively large opening exposing a record placed in the jacket. From the standpoint of record protection, this procedure destroys the usefulness of the record jacket.

In accordance with the present invention, these difficulties are avoided and the record protecting integrity of the jacket is maintained by providing a picture section of the outer panel of the jacket, which section is not adherred to the underlying material of the jacket but is attached along perforated tear lines to marginal portions of the outer panel. As removal of the picture section would create a large unsightly opening in the panel and expose the phonograph jacket, a middle panel is provided to which the marginal edges of the outer panel are adhered, which middle panel carries a picture or printed matter disposed directly beneath the removable picture section. Thereby, when the picture of the outer panel is removed, the jacket will still function to protect the phonograph record within it and the appearance of the jacket will remain substantially unchanged.

In this invention, a single blank is so folded that a four layer spine or stiffened portion is provided, the outer edge of which may be used for printing the title, artist, manufacturer's catalogue number, etc., so that in vertical position on a shelf, the spine edge of the jacket bearing such title, etc. is readily visible.

For a fuller understanding of the invention principles, reference is made to the following description of typical embodiments thereof as illustrated in the accompanying drawings. In the drawings.

Figure 1:
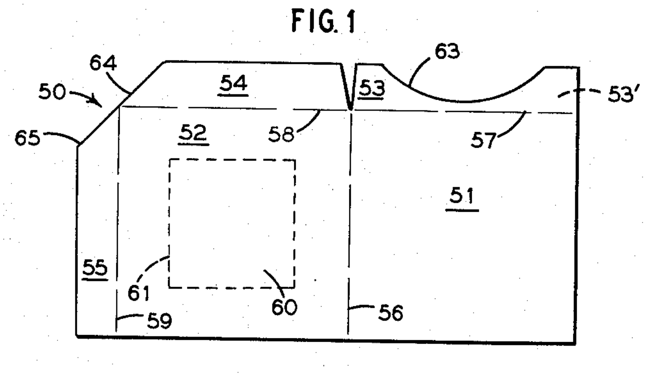
FIG. 1 is a plan view of a jacket showing the inside of a die-cut blank for making a phonograph jacket.

Referring to FIGS. 1 to 5 of the drawings, numeral 50 represents a modified die-cut cardboard blank which is formed into a phonograph jacket and comprises two substantially square panels 51, 52, an inner spine flap 53 and two outer flaps 54, 55. The inner spine flap 53 extends from the back edge of rear panel 51; the outer flap 54 extends from the back edge of front panel 52 and the outer flap 55 extends from the side edge of front panel 52. The panels 51, 52 are divided by a crease line 56; flap 53 is divided from the back edge of rear panel 51 by crease line 57, and outer flaps 54, 55 are divided by crease lines 58, 59 from the back edge and the side edge, respectively, of front panel 52. The front panel 52 is provided with a removable picture section 60 defined by a perforated tear outline 61. At the time the blank 50 is cut, the crease lines 56, 57, 58, 59 and the tear lines 61 are made simultaneously.

The cardboard blank of FIG. 1 is shown with the "unfinished" side up, the opposite side being of a "finished" surface and imprinted with any desirable lettering and/or pictures, either black and white, colored or both. The "finished" surface may be of "slick" or glossy paper in surface-to-surface adhering contact to the cardboard, if desired.

Figure 2:
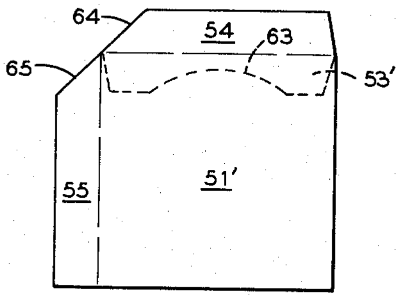
FIG. 2 is a plan view of the blank shown in FIG. 1 with the rear panel folded upon the front panel.
Figure 3:
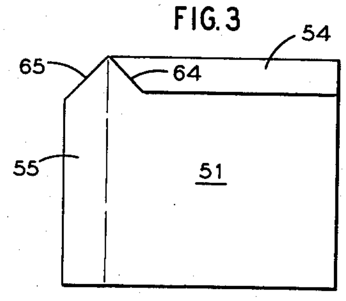
FIG. 3 is the same plan view as that shown in FIG. 2 except that the flap 54 has been glued to the rear panel.

The envelope or jacket is formed by first applying glue simultaneously to the inside faces of flaps 53, 54 and 55. The inner spine flap 53 is then folded inwardly upon and adhered to rear panel 51. The opposite face 53' of flap 53 then has glue applied to it. The rear panel 51 is then folded inwardly upon front panel 52 so that face 53' of flap 53 may be made to adhere to the back marginal edge of panel 52, as shown in FIG. 2, if desired or it may be free of adhesive. It should be noted that flap 53 has an arcuate cut-out portion 63 which is the segment of the arc or circumference of a phonograph record. The flaps 54, 55 are then folded inwardly and downwardly upon the outer face 51' of the rear panel 51 and glued thereto. FIG. 3 shows flap 54 folded and adhered to the outer face 51' of rear panel 51. The inner edges 64, 65 of flaps 54, 55 have been cut at a 45° angle so that when flaps 54, 55 are glued to the rear panel, the corner will be mitered and flaps 54, 55 will be flat and on the same plane.

The finished jacket then moves into a pressure or canvas device which stacks one or more of such jackets into a pressure section for final drying.

Figure 4:
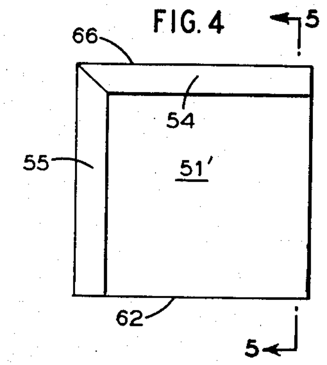
FIG. 4 is a plan view of the rear or back of the completed jacket with both the outer flaps glued to the rear panel.
Figure 5:
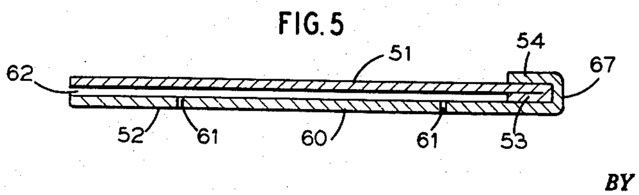
FIG. 5 is a sectional view on line 5—5 of FIG. 4.

It should be noted that after the flaps 53, 54 and 55 have been glued into place, as best shown in FIG. 4, a four section ply or lamination results at the back end 66 of the jacket forming a stiffened or spine portion at such back end 66. The outer or edge 67 is a narrow panel extending the entire height of the jacket and may be used for printing the title of the song, name of the artist or performer, insignia or monogram of the manufacturer or producer and the catalogue number of the manufacturer's item.

When the phonograph record is inserted into the jacket through the open side 62, the inner edge of the phonograph record will abut the arcuate edge 63 of flap 53, thus aiding in positioning the phonograph record within its jacket and saving cardboard since the phonograph record can be inserted further within the jacket.

If a person desires to remove the picture section 60, it is a simple matter to lift a corner of section 60 by passing the point of a knife along the perforated tear outline 61 and then lifting the picture section 60 gently along the tear outline 61. To facilitate such removal of the picture section, a starter tab may be provided which may be lifted with the finger nail to initiate the removal of the picture section.

Although the removal of the picture section 60 will mar the outer face of the front panel 52, it will not destroy the jacket since a marginal frame will remain around the panel 52. The jacket will still be in usable condition because a cellophane or paper envelope is usually used to protect the phonograph record against marring and dust.

In the drawings, the flaps 53, 54, 55 have been exaggerated in width for illustrative purposes. However, the width of such flaps may be varied to suit the thickness and type of cardboard used for the jacket.

While specific embodiments of the invention and method of making the jacket have been shown and described in detail to illustrate the application of the invention principles, it will be understood that the invention and the method of making the jacket may be altered without departing from the general spirit of the invention.

What is claimed is:

1. A blank adapted to be folded into a phonograph record jacket comprising a single cardboard sheet having a crease line defining a front and rear panel, said panels being substantially square and of equal size, an inner spine flap extending from one side of the blank and coextensive with said rear panel, a first outer flap extending from said one side of said blank and coextensive with said front panel, a second outer flap extending from a second side of said blank and coextensive with said front panel, said second side being immediately adjacent said one side of said blank and at substantially right angles thereto, and said front panel having a removable section therein defined by a perforated tear outline.

2. A blank as defined in claim 1 in which said inner spine flap has an arcuate cut-out therein.

3. A phonograph record jacket having three closed sides and an open side for inserting a phonograph record therein, said jacket formed from a single blank, said blank having a crease line defining a front and rear panel, said panels being substantially square and of equal size, an inner spine flap extending from one side of said blank and coextensive with said rear panel, said spine flap being folded inwardly and glued to said rear panel, a first outer flap extending from said one side of said blank and coextensive with said front panel, a second outer flap extending from a second side of said blank and coextensive with said front panel, said second side being immediately adjacent said one side of said blank and at substantially right angles thereto, said rear panel being folded over said front panel on said crease line and glued to the face of said spine flap, and said outer flaps being folded inwardly over and glued to said rear panel, said front panel having a removable section therein defined by a perforated tear outline.

4. A phonograph record jacket as defined in claim 3, in which said inner spine flap has an arcuate cut-out therein adapted to accommodate the arcuate edge of a phonograph record.

References Cited in the file of this patent

UNITED STATES PATENTS

| | | |
|---|---|---|
| 1,715,533 | Bowersock | June 4, 1929 |
| 2,866,541 | Ravis | Dec. 30, 1958 |

FOREIGN PATENTS

| | | |
|---|---|---|
| 404,515 | Great Britain | Jan. 18, 1934 |
| 621,192 | Great Britain | Apr. 5, 1949 |